June 8, 1943.  G. H. GARRISON  2,321,193
GAME CALL
Filed Sept. 30, 1941
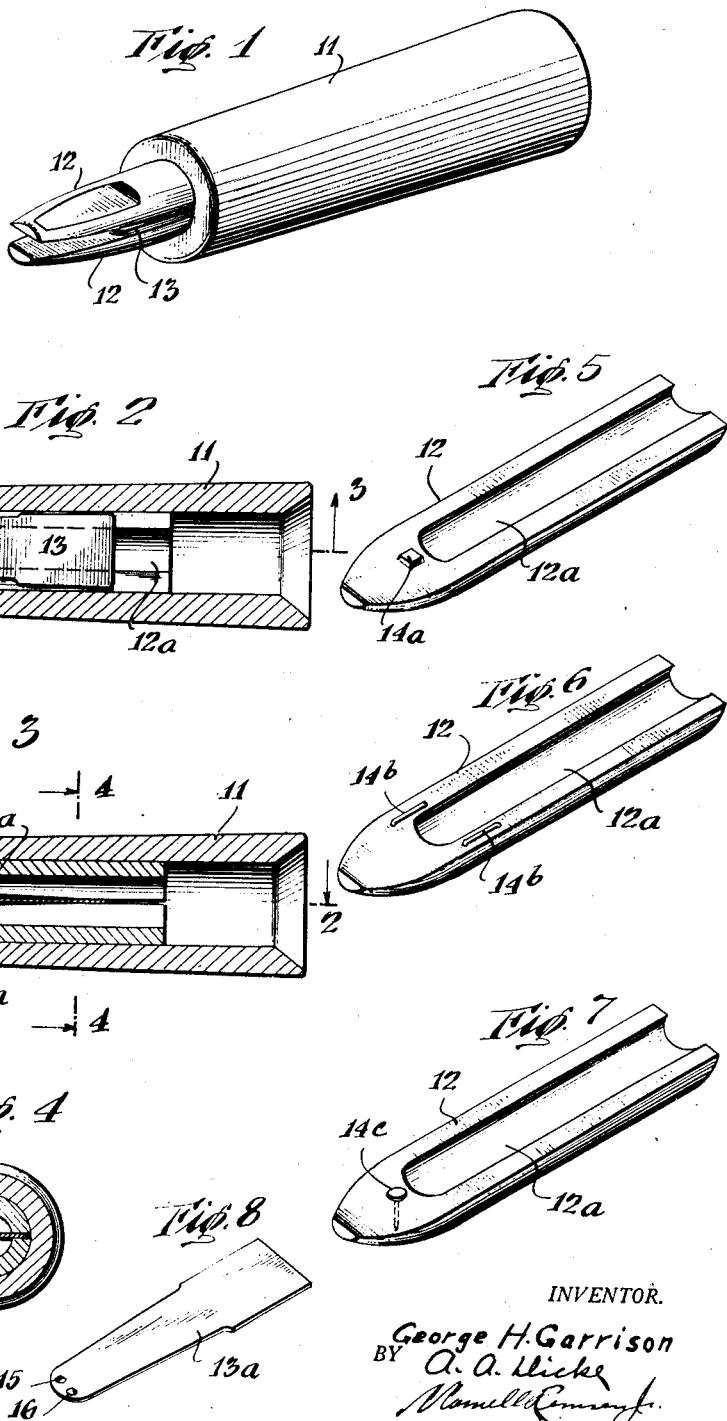
INVENTOR.
George H. Garrison
ATTORNEYS Patented June 8, 1943

2,321,193

UNITED STATES PATENT OFFICE 2,321,193

GAME CALL

George H. Garrison, Delphi, Ind.

Application September 30, 1941, Serial No. 412,929

7 Claims. (Cl. 46—180)

This invention relates to improvements in game calls and has for an object to improve such devices to make them more certain of operation. Known devices for this purpose comprise a reed which is clamped at one end and is free on the other end to vibrate between two limiting surfaces. The reed is usually made of flat sheet material and the limiting surfaces are flat and arranged in divergent planes. These surfaces form part of projecting members engaged by the teeth of the user who by varying the pressure upon the projecting members varies the tone to imitate the call of game such as crows and other birds. It has been found that saliva will sometimes work in between the reed and one of the limiting surfaces and will cause the reed to stick to the said limiting surface thus putting the device out of operation. It is an object of the present invention to provide means which will prevent the reed engaging the limiting surfaces over any substantial area so that sticking of the reed thereto will be avoided.

Other objects will become apparent from the following description taken in connection with the attached drawing showing several illustrative embodiments of the invention and wherein:

Fig. 1 is a perspective view of a game call embodying the invention

Fig. 2 is a cross-sectional view thereof on a horizontal plane

Fig. 3 is a cross-section along the line 3—3 of Fig. 2

Fig. 4 is a cross-section along the line 4—4 of Fig. 3

Fig. 5 is a perspective view of one of the parts showing one form the invention may take Figs. 6 and 7 are perspective views similar to Fig. 5 showing modifications, and Fig. 8 is a fragmentary view of a modified reed.

Referring to said drawing the numeral 11 indicates the tubular housing of the device, the internal bore of which is preferably tapered slightly. Mounted within said bore are two reed engaging members 12 between which the reed 13 is clamped. This is accomplished by placing the reed in proper position between the members 12 and pressing them into the taper bore of the member 11 to about the position shown. The members 12 are preferably each formed with a depression 12a to provide an air passage. The reed 13 extends outwardly beyond the depression 12a so that the end of the reed as well as its sides over-lie the members 12 which serve as limiting surfaces for limiting the amplitude of vibration of the reed.

As described thus far the device embodies known construction. As the reed may lie very closely to one of the limiting surfaces saliva may collect between them and cause the reed to stick to one of the members 12 preventing operation. To avoid this the invention contemplates the use of one or more spacing elements formed either on one or both the members 12 or upon one or both sides of the reed near its free end. One means of forming the spacing element is by using the wire staple 14 shown in Figs. 2 and 3. This insures that the reed 13 does not engage either member 12 except at its clamped end. The area of engagement of the reed with the staple 14 is so small that accidental adhesion is impossible. Furthermore if adhesion should occur there is sufficient space between the reed and the member 12 so that air can pass between. The air causes vibration of the reed and overcomes any slight adhesion which might take place as between the staple 14 and the reed 13.

In Fig. 5 the spacing projection takes the form of an island 14a projecting from the member 12 and preferably integral therewith. In Fig. 6 two spacing projections such as staples 14b are shown. In Fig. 7 the spacing 7 is shown as taking the form of the head 14c of a small nail.

In the form shown in Fig. 8 the spacing elements are formed on the reed 13a and not on the teeth engaging member 12 to be used therewith. The spacing element may conveniently be formed, as shown, by embossing one or two indentations as 15 in the material of the reed forming a projection on the reverse side such as 16.

It will be noted that in all the forms of the invention a spacing element is provided which prevents the engagement of the free end of the reed with the limiting surfaces on member 12 over any substantial area. Therefore the presence of saliva will not cause the reed to stick. In any event a passage is provided to permit air to penetrate under the reed to vibrate and free it.

Another form the invention might take is to form a depressed channel in the member 12 at about the point where the island 14a (Fig. 5) and the nail head 14c (Fig. 7) are located. This passage might extend to the end of the member 12 or at least beyond the free end of the reed 13. This passage permits air to penetrate under the reed to start its vibration and to free it from any sticking tendency.

The invention is not intended to be limited to the forms shown, which are to be understood as illustrative only and not as limiting, as various changes in construction and arrangement may be made, all coming within the scope of the claims which follow:

I claim:

1. A game call comprising a vibratory reed, means for clamping one end of said reed, vibration limiting surfaces adjacent the free end of said reed and at least one spacing member of substantially less width than said reed, located between said vibration limiting surface and said reed.

2. A game call comprising a vibratory reed, means for clamping one end of said reed, vibration limiting surfaces adjacent the free end of said reed and at least one spacing projection of substantially less width than said reed, carried by said vibration limiting surface and extending slightly above said surface.

3. A game call comprising a vibratory reed, means for clamping one end of said reed, vibration limiting surfaces adjacent the free end of said reed and at least one spacing projection of substantially less width than said reed, carried by said reed and engaging said vibration limiting surface.

4. A game call comprising a vibratory reed, means for clamping one end of said reed, vibration limiting surfaces adjacent the free end of said reed and at least one spacing projection of substantially less width than said reed, carried by said reed and engaging said vibration limiting surface, said projection being formed by embossing outwardly a portion of the material of said reed.

5. A game call comprising a vibratory reed, means for clamping one end of said reed, a member formed with a vibration limiting surface adjacent the free end of said reed and at least one spacing projection of substantially less width than said reed, carried by said vibration limiting surface and extending slightly above said surface, said projection being formed integral with said member.

6. A game call comprising a vibratory reed, means for clamping one end of said reed, a member formed with a surface adjacent the free end of said reed and at least one spacing projection of substantially less width than said reed, carried by said vibration limiting surface and extending slightly above said surface, said projection comprising a staple having prongs driven into said member.

7. A game call comprising a vibratory reed, means for clamping one end of said reed, a member formed with a surface adjacent the free end of said reed and at least one spacing projection of substantially less width than said reed, carried by said vibration limiting surface and extending slightly above said surface, said projection comprising the head of a nail driven into said member.

GEORGE H. GARRISON.